United States Patent
Bhattacharjee et al.

(10) Patent No.: US 11,824,704 B2
(45) Date of Patent: *Nov. 21, 2023

(54) COMPUTER NETWORK TROUBLESHOOTING AND DIAGNOSTICS USING METADATA

(71) Applicant: Bank of America Corporation, Charlotte, NC (US)

(72) Inventors: Sunny Bhattacharjee, Uttam Nagar West (IN); Rakesh Jain, Gurgaon (IN); Adi Narayana Rao Garaga, Hyderabad (IN); Sidhan Ponnanakkal, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,920

(22) Filed: Jan. 12, 2023

(65) Prior Publication Data
US 2023/0308343 A1 Sep. 28, 2023

Related U.S. Application Data

(63) Continuation of application No. 17/705,341, filed on Mar. 27, 2022, now Pat. No. 11,595,245.

(51) Int. Cl.
*G06F 15/173* (2006.01)
*H04L 41/0654* (2022.01)
(Continued)

(52) U.S. Cl.
CPC .......... *H04L 41/0654* (2013.01); *H04L 41/12* (2013.01); *H04L 43/0823* (2013.01); *H04L 45/22* (2013.01)

(58) Field of Classification Search
CPC . H04L 41/0654; H04L 41/12; H04L 43/0823; H04L 45/22
See application file for complete search history.

(56) References Cited

U.S. PATENT DOCUMENTS

| | | | |
|---|---|---|---|
| 4,827,411 A | 5/1989 | Arrowood et al. | |
| 5,127,005 A | 6/1992 | Oda et al. | |
| (Continued) | | | |

FOREIGN PATENT DOCUMENTS

EP 3734520 A1 11/2020

OTHER PUBLICATIONS

Bhattacharjee, S. et al., "Computer Network Architecture Mapping Using Metadata," U.S. Appl. No. 17/705,340, filed Mar. 27, 2022, 31 pages.
(Continued)

*Primary Examiner* — Wing F Chan
*Assistant Examiner* — Joseph R Maniwang

(57) ABSTRACT

A device is configured to detect a triggering event within a network that is associated with a communication error between a first network device and a second network device. The device is further configured to identify a first node in a computer network map corresponding with the first network device and to identify node properties for the first node. The device is further configured to identify the error correction instructions in the node properties for the first node that include an address for rerouting data traffic to a third network device. The device is further configured to apply the error correction instructions where applying the error correction instructions suspends data traffic to the second network device and reroutes data traffic to the third network device.

20 Claims, 5 Drawing Sheets

(51) Int. Cl.
  *H04L 43/0823* (2022.01)
  *H04L 41/12* (2022.01)
  *H04L 45/00* (2022.01)

(56) References Cited

U.S. PATENT DOCUMENTS

| | | | |
|---|---|---|---|
| 5,436,909 A | 7/1995 | Dev et al. | |
| 5,539,877 A | 7/1996 | Winokur et al. | |
| 5,666,481 A | 9/1997 | Lewis | |
| 5,864,662 A | 1/1999 | Brownmiller et al. | |
| 5,872,911 A | 2/1999 | Berg | |
| 6,012,152 A | 1/2000 | Douik et al. | |
| 6,088,717 A | 7/2000 | Reed et al. | |
| 6,108,300 A * | 8/2000 | Coile | H04B 1/74 714/4.12 |
| 6,252,852 B1 | 6/2001 | Rowles et al. | |
| 6,393,386 B1 | 5/2002 | Zager et al. | |
| 7,191,364 B2 | 3/2007 | Hudson et al. | |
| 7,200,525 B1 | 4/2007 | Williams et al. | |
| 7,203,624 B2 | 4/2007 | Warshawsky | |
| 7,254,750 B1 | 8/2007 | Okun et al. | |
| 7,379,846 B1 | 5/2008 | Williams et al. | |
| 7,380,172 B2 | 5/2008 | Srinivas et al. | |
| 7,516,025 B1 | 4/2009 | Williams et al. | |
| 7,620,856 B2 | 11/2009 | Kagan et al. | |
| 7,856,575 B2 | 12/2010 | Bock et al. | |
| 7,937,623 B2 | 5/2011 | Yu et al. | |
| 8,386,848 B2 | 2/2013 | Grell et al. | |
| 8,418,001 B2 | 4/2013 | Knrl et al. | |
| 8,555,112 B2 | 10/2013 | Shimada et al. | |
| 8,990,625 B2 | 3/2015 | Xiang | |
| 10,162,696 B2 | 12/2018 | Kogan-Katz et al. | |
| 10,528,452 B2 | 1/2020 | Iyer et al. | |
| 10,565,045 B2 | 2/2020 | Kirshenbaum et al. | |
| 10,810,074 B2 | 10/2020 | Yu et al. | |
| 10,922,164 B2 | 2/2021 | Venkataraman et al. | |
| 11,595,245 B1 * | 2/2023 | Bhattacharjee | H04L 43/0823 |
| 2004/0078683 A1 | 4/2004 | Buia et al. | |
| 2004/0187048 A1 | 9/2004 | Angamuthu et al. | |
| 2005/0278273 A1 | 12/2005 | Uthe | |
| 2006/0117059 A1 | 6/2006 | Freeman et al. | |
| 2010/0098085 A1 | 4/2010 | Wu | |
| 2015/0081863 A1 | 3/2015 | Garg et al. | |
| 2015/0168271 A1 | 6/2015 | He et al. | |
| 2015/0193290 A1 | 7/2015 | He et al. | |
| 2019/0129779 A1 | 5/2019 | Adamson et al. | |

OTHER PUBLICATIONS

[retrieved on Jul. 29, 2023] Retrieved from the Internet <URL:// https://neo4j.com/.
[retrieved on Jul. 26, 2023] Retrieved from the Internet <URL:// https://en.wikipedia.org/wiki/Living_systems.

* cited by examiner

COMPUTER NETWORK TROUBLESHOOTING AND DIAGNOSTICS USING METADATA

CROSS-REFERENCE TO RELATED APPLICATION

The application is a continuation of U.S. patent application Ser. No. 17/705,341, filed Mar. 27, 2022, by Sunny Bhattacharjee, and entitled "COMPUTER NETWORK TROUBLESHOOTING AND DIAGNOSTICS USING METADATA," which is incorporated herein by reference.

TECHNICAL FIELD

The present disclosure relates generally to process management for a computer network, and more specifically to computer network troubleshooting and diagnostics using metadata.

BACKGROUND

In a computer network, data is routinely being processed and transferred between different network devices. Over time, network devices may experience different types of issues that cause failed data communications. For example, a network device's memory resources (e.g. available disk space) are gradually consumed and reduced. Eventually, the network device's memory resource may become so low that the network device is no longer able to receive or store new data from other network devices. In existing systems, data transmissions begin to fail when the receiving network device has an insufficient amount of memory resources available. As data transfer begins to fail, a bottleneck is formed as other network devices continue to try to send data to the network device that is low on memory resources. This bottleneck reduces the flow of data through a communication system which degrades the throughput and performance of the system and may cause the system to come to a halt. In other examples, network devices may experience software and/or hardware issues that lead to failed data communications.

SUMMARY

The disclosed system provides several practical applications and technical advantages that overcome the previously discussed technical problems. The following disclosure provides a practical application of a network error correction device for a computer system. The disclosed network error correction device provides practical applications that improve the throughput and resource utilization of network devices and the computer system by dynamically rerouting data traffic in the event that there is an issue with one or more network devices. This process generally involves generating a computer network map that contains information about the network devices within a network and the communication channels between the network devices. The computer network map also contains error correction instructions for how to reroute data traffic in the event that an issue is detected with a network device. When a triggering event that is associated with a failed data communication within the network is detected, the network error correction device will identify any network devices that are associated with the failed data communication and their corresponding error correction instructions. The network error correction device will then apply the identified error correction instructions to reroute data traffic within the network. The disclosed network error correction device provides a technical improvement by dynamically rerouting data traffic within the network when a data communication issue is detected. This process allows the network error correction device to manage the data traffic for the network devices in the computer system to provide improved data throughput for the computer system and improved hardware utilization. Thus, this process provides improved resource utilization and improved data throughput which improves the overall performance of network devices and the computer system.

In one embodiment, the computer system comprises a network error correction device that is configured to obtain network traffic information that is associated with a first network device and to identify a second network device that communicates data with the first network device. The network error correction device is further configured to identify device settings for sending data traffic to the second network device and to identify error correction instructions for rerouting data traffic to another network device. The network error correction device is further configured to generate node properties for the first network device that include a first network device identifier, a second network device identifier, the device settings for the second network device, and the error correction instructions. The network error correction device is further configured to add a first node to a computer network map for the first network device and to associate the node properties with the first node and output the computer network map. The network error correction device may repeat this process for any other network devices within the network.

In another embodiment, the computer system comprises a network error correction device that is configured to detect a triggering event within a network that is associated with a communication error between a first network device and a second network device. The network error correction device is further configured to identify a first node in a computer network map corresponding with the first network device and to identify node properties for the first node. The network error correction device is further configured to identify the error correction instructions in the node properties for the first node that include an address for rerouting data traffic to a third network device. The network error correction device is further configured to apply the error correction instructions, where applying the error correction instructions suspends data traffic to the second network device and reroutes data traffic to the third network device.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Computer System Overview

Figure 1:
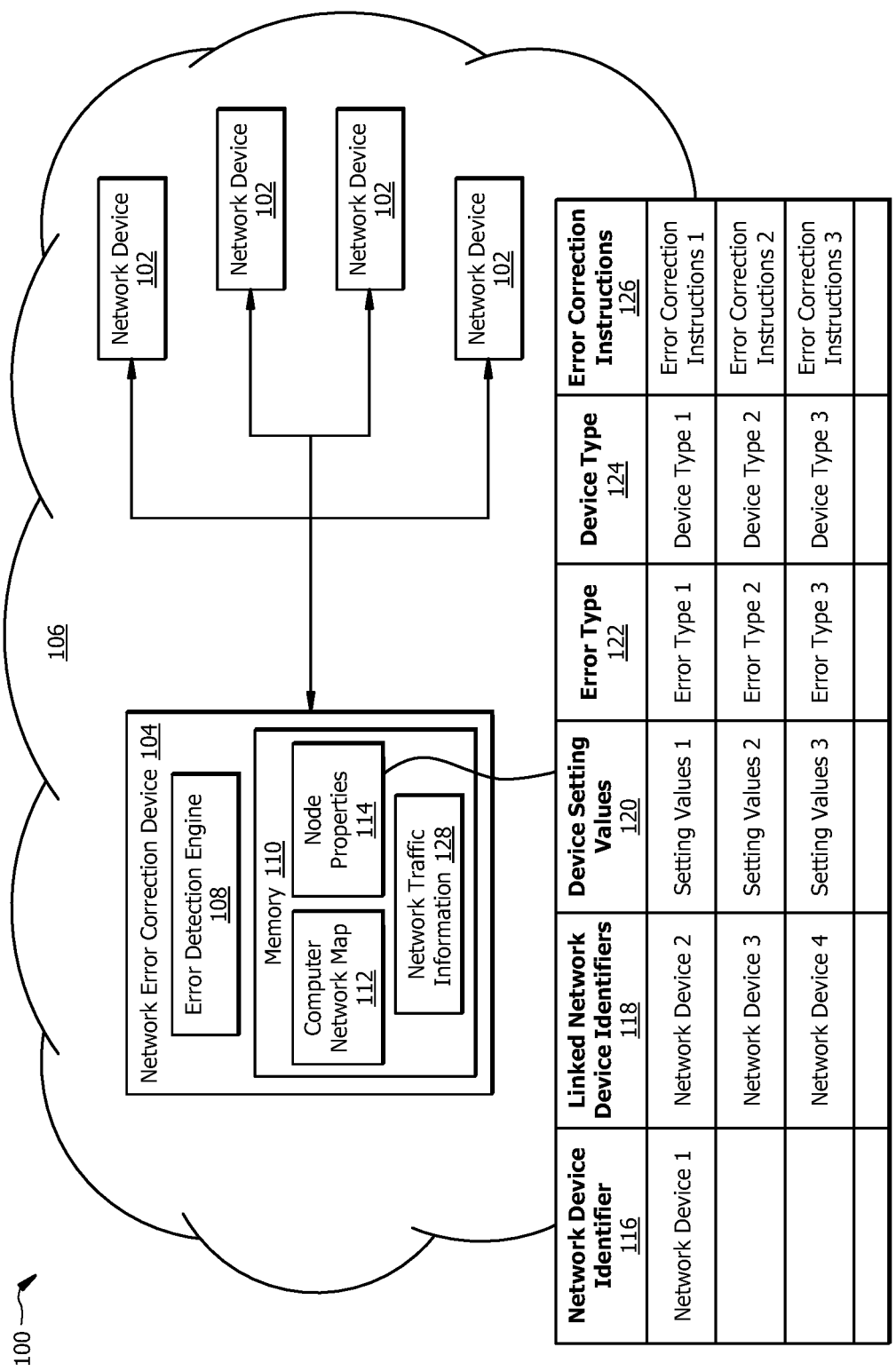
FIG. 1 is a schematic diagram for a computer system configured to use a network error correction device.

FIG. 1 is a schematic diagram of an embodiment of a computer system 100 that is generally configured to generate a computer network map 112 that contains information about the network devices 102 within a network 106 and the communication channels between the network devices 102. The computer network map 112 also contains error correction instructions 126 for how to reroute data traffic in the event that an issue is detected with a network device 102. For example, when a triggering event that is associated with a failed data communication within the network 106 is detected, a network error correction device 104 will identify any network devices 102 that are associated with the failed data communication and their corresponding error correction instructions 126. After identifying the error correction instructions 126, the network error correction device 104 will then apply the identified error correction instructions 126 to reroute data traffic within the network 106. This process allows the computer system 100 to dynamically reroute data traffic within the network 106 when a data communication issue is detected.

In one embodiment, the computer system 100 comprises one or more network devices 102 and a network error correction device 104. The network devices 102 and the network error correction device 104 are in signal communication with each other within a network 106. The network 106 allows communication between and amongst the various components of the computer system 100. This disclosure contemplates the network 106 being any suitable network operable to facilitate communication between the components of the computer system 100. The network 106 may include any interconnecting system capable of transmitting audio, video, signals, data, messages, or any combination of the preceding. The network 106 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Network Devices

A network device 102 is a hardware device that is generally configured to provide hardware and software resources to a user. Examples of a network device 102 include, but are not limited to, a server, an access point, a laptop, a computer, a smartphone, a tablet, a smart device, an Internet-of-Things (IoT) device, or any other suitable type of device. In some embodiments, the network device 102 may comprise a graphical user interface (e.g. a display), a touchscreen, a touchpad, keys, buttons, a mouse, or any other suitable type of hardware that allows a user to view data and/or to provide inputs into the network device 102. One or more network devices 102 may be configured to be in signal communication with each other. For example, a network device 102 may receive data traffic from one or more upstream network devices 102 and may send data traffic to one or more downstream network devices 102.

Network Error Correction Device

Examples of a network error correction device 104 include, but are not limited to, a server, an access point, a computer, or any other suitable type of network device. In one embodiment, a network error correction device 104 comprises an error detection engine 108 and a memory 110. Additional details about the hardware configuration of the network error correction device 104 are described in FIG. 5. The memory 110 is configured to store computer network maps 112, node properties 114, and/or any other suitable type of data.

In one embodiment, the error detection engine 108 is generally configured to generate a computer network map 112 for the network 106. An example of the error detection engine 108 performing this operation is described in more detail in FIG. 2. The computer network map 112 generally comprises information about the network devices 102 within the network 106 and their relationship with each other based on the network traffic within the network 106. An example of a computer network map 112 is shown in FIG. 3. Referring to the example in FIG. 3, a computer network map 112 generally comprises a plurality of nodes 302 and edges 304. Each node 302 corresponds with a network device 102 within the network 106. Each edge 304 corresponds with a communication channel between a pair of network devices 102. For example, an edge 304 between a first node 302 and a second node 302 represents a data channel for traffic between a first network device 102 and a second network device 102.

The error detection engine 108 is further configured to associate each node 302 with node properties 114. The node properties 114 comprise information that identifies any network devices 102 that are linked with a network device 102 using a communication channel (i.e. an edge 304). An example of node properties 114 is shown in FIG. 1. In this example, the node properties 114 comprise network device identifiers 116, linked network device identifiers 118, device setting values 120, error type identifiers 122, device type identifiers 124, and error correction instructions 126. The network device identifier 116 identifies a network device 102 that a node 302 represents in the computer network map 112. Examples of a network device identifier 116 include, but are not limited to, an Internet Protocol (IP) address, a Media Access Control (MAC) address, a device name, a serial number, an alphanumeric code, or any other suitable type of identifier. The linked network device identifiers 118 identifies other network devices 102 that have a communication channel with a network device 102. Examples of a linked network device identifier 118 include, but are not limited to, an IP address, a MAC address, a device name, a serial number, an alphanumeric code, or any other suitable type of identifier. The device setting values 120 identify settings for access or communicating with another network device 102. Examples of device setting values 120 include, but are not limited to, an IP address, a MAC address, and a Uniform Resource Locator (URL). The error type identifiers 122 identify a type of error that a network device 102 is experiencing when trying to communicate with another network device 102. The error type identifiers 122 allow the error detection engine 108 to perform different types of remediation techniques based on the type of error that occurs. The device type identifiers 124 identifies a type of device that a network device 102 is communicating with. Examples of devices types include, but are not limited to, a server, an access point, a laptop, a computer, a smartphone, a tablet, a smart device, an IoT device, or any other suitable type of device. The error correction instructions 126 comprises instructions for rerouting data traffic to another network device 102 in the event that an error occurs. For example, the error correction instructions 126 may identify an address (e.g. an IP address or MAC address) or device setting values 120 for another network device 102. In some embodiments, the error correction instructions 126 may comprise machine-executable instructions, scripts, source code, macros, or any other suitable type of instructions that can be executed by a network device 102 to reroute data traffic to another network device 102. In other examples, the node properties 114 may comprise any other suitable type of information or combination, thereof.

The error detection engine 108 is further configured to monitor the network 106 for triggering events that correspond with failed communications between network devices 102, to use the computer network map 112 to identify error correction instructions 126 for any affected network devices 102, and to apply error correction instructions 126 to reroute data traffic within the network 106. An example of the error detection engine 108 performing this operation is described in more detail in FIG. 4.

Computer Network Mapping Process

Figure 2:
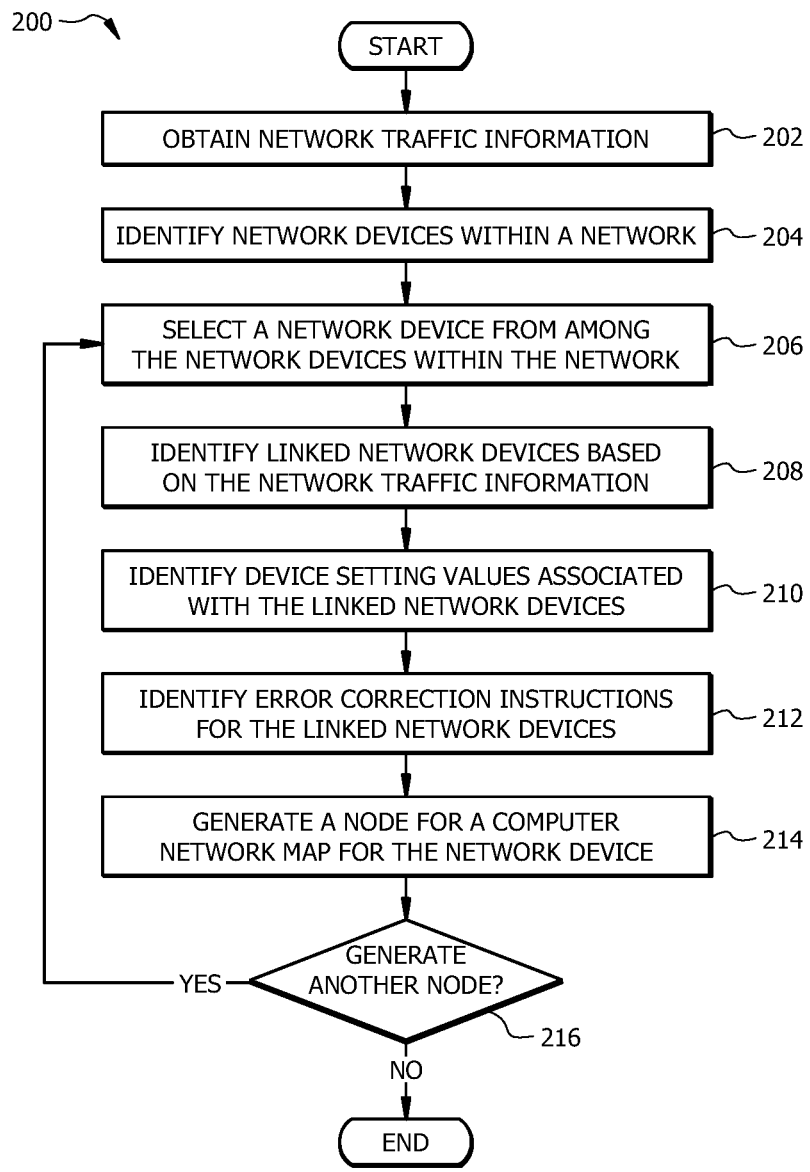
FIG. 2 is a flowchart of an embodiment of a computer network mapping process for the computer system.
Figure 3:
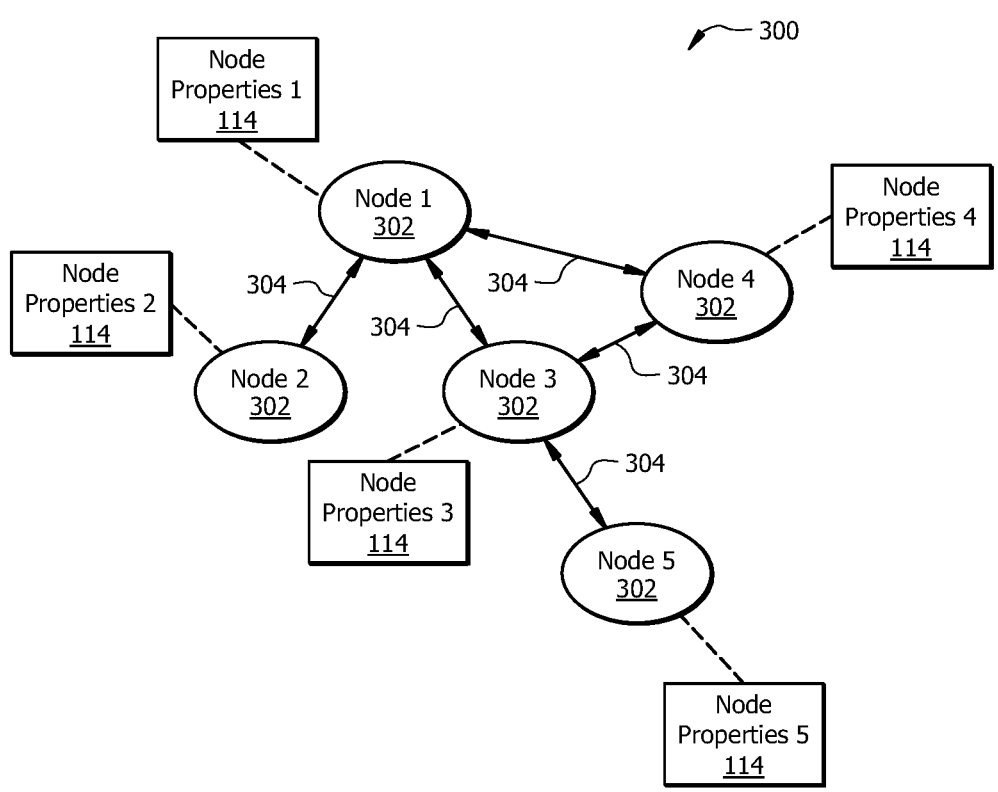
FIG. 3 is an example of a graphical representation of a computer network map.

FIG. 2 is a flowchart of an embodiment of a computer network mapping process 200. The computer system 100 may employ process 200 to generate a computer network map 112 that contains information about the network devices 102 within the network 106 and the communication channels between the network devices 102. The computer network map 112 also contains error correction instructions 126 for how to reroute data traffic in the event that an issue is detected with a network device 102.

At operation 202, the network error correction device 104 obtains network traffic information 128 for the network device 102. In one embodiment, the network error correction device 104 may obtain network traffic information 128 for the network 106 from one or more access points and/or network devices 102 in the network 106. The network traffic comprises information about the data communications between the network devices 102 in the network 106. For example, the network traffic information 128 may be a network log that comprises timestamps corresponding with data communications between a sending network device 102 and a receiving network device 102.

At operation 204, the network error correction device 104 identifies network devices 102 within the network 106 based on the network traffic information 128. Here, the network error correction device 104 identifies any network devices 102 that are referenced in the network traffic information 128, for example as a sending or receiving network device 102, to generate a list of all of the network devices 102 within the network 106. In one embodiment, the network error correction device 104 generates a list of network device identifiers 116 for all of the network devices 102 that are present in the network traffic information 128.

After identifying all of the network devices 102 in the network 106, the network error correction device 104 begins the process of generating nodes 302 for each of the identified network devices 102 for the computer network map 112. At operation 206, the network error correction device 104 selects a network device 102 from among the network devices 102 in the network 106. Here, the network error correction device 104 begins iteratively selecting network devices 102 to aggregate the data that is associated with the network device 102 and to generate a node 302 and node properties 114 for the network error correction device 104.

For example, on the first iteration, the network error correction device 104 may select a first network device identifier 116 for a first network device 102. On subsequent iterations, the network error correction device 104 may select another network device identifier 116 for another network device 102.

At operation 208, the network error correction device 104 identifies linked network devices 102 based on the network traffic information 128. After selecting a network device 102, the network error correction device 104 filters the network traffic information 128 that was obtained in operation 202 to identify any network traffic information 128 that is associated with the selected network device 102. For example, the network error correction device 104 may identify any network traffic information 128 that corresponds with when the selected network device 102 was either a sending or receiving network device 102 in a data communication with another network device 102. After identifying the network traffic information 128 that is associated with the selected network device 102, the network error correction device 104 then generates a list of all the other network devices 102 that the selected network device 102 communicated with. These other network devices 102 may also be referred to as linked network devices 102 for the selected network device 102 since they each have a link or communication channel with the selected network device 102. After identifying the linked network devices 102 for the selected network device 102, the network error correction device 104 generates a list of linked network device identifiers 118 for the identified network devices 102.

At operation 210, the network error correction device 104 identifies device setting values associated with the linked network devices 102. Once the network error correction device 104 identifies the other network devices 102 that communicate with the selected network device 102, the network error correction device 104 uses the network traffic information 128 to identify any device setting values 120 that are used for communicating with the identified network devices 102. For example, the network error correction device 104 may identify IP addresses that are used for communicating with each of the identified network devices 102. In other examples, the network error correction device 104 may identify any other suitable type of device setting value or information that can be used to communicate with a network device 102.

At operation 212, the network error correction device 104 identifies error correction instructions for the linked network devices 102. Here, the network error correction device 104 identifies instructions for rerouting data traffic in the event that a network device 102 is unavailable or has issues. For example, the network error correction device 104 may identify any alternative network devices 102 and communication channels in the network traffic information 128 that can be used to substitute one of the linked network devices 102. In some embodiments, the network error correction device 104 may receive user input that specifies alternative network devices 102 and communication channels that can be used to substitute one of the linked network devices 102. In some embodiments, after identifying an alternative network devices 102, the network error correction device 104 may obtain or generate machine-executable code for rerouting data traffic to the identified alternative network device 102. For example, the network error correction device 104 may generate machine-executable code or scripts that modify the IP address for outbound data traffic to reroute the data traffic to the alternative network device 102. In other examples, the network error correction device 104 may generate any other suitable type of machine-executable code or scripts for rerouting data traffic to an alternative network device 102.

At operation 214, the network error correction device 104 generates a node 302 in the computer network map 112 for the network device 102. Here, the network error correction device 104 begins by adding a representation of a node 302 to computer network map 112. The network error correction device 104 then adds edges 304 that connect to nodes 302 that represent other network devices 102 that have a communication channel with the network device 102. The network error correction device 104 then generates node properties 114 for the network device 102. In one embodiment, the node properties 114 may comprise a network device identifier 116 for the selected network device 102, linked network device identifiers 118 for the linked network devices 102, device setting values 120 for communicating with each of the linked network devices 102, error type identifiers 122 for different types of communication issues, device type identifiers 124 for the linked network devices 102, and error correction instructions 126 for rerouting data traffic to alternative network devices 102. In other embodiments, the node properties 114 may further comprise any other suitable type of information. After generating the node properties 114, the network error correction device 104 associates the node properties 114 with the node 302 in the computer network map 112 that represents the network device 102.

At operation 216, the network error correction device 104 determines whether to generate another node 302 in the computer network map 112 for another network device 102. Here, the network error correction device 104 determines whether a node 302 has been generated for all of the network devices 102 that were identified in operation 202. The network error correction device 104 will determine to generate another node 302 when one or more network devices 102 have not been mapped to a node 302 in the computer network map 112. The network error correction device 104 returns to operation 206 in response to determining to generate another node 302. In this case, the network error correction device 104 returns to operation 204 to generate another node 302 in the computer network map 112 for another network device 102.

The network error correction device 104 terminates process 200 in response to determining not to generate another node 302. In some embodiments, the network error correction device 104 outputs the computer network map 112 before terminating process 200. For example, the network error correction device 104 may output the computer network map 112 by storing the computer network map 112 in memory 110. As another example, the network error correction device 104 may output the computer network map 112 by sending the computer network map 112 to another network device 102 or database. As another example, the network error correction device 104 may output the computer network map 112 by generating a graphical representation of the computer network map 112 and displaying the graphical representation on a graphical user interface (e.g. a display screen). An example of a graphical representation of a computer network map 112 is shown in FIG. 3. In other examples, the network error correction device 104 may output the computer network map 112 using any other suitable technique.

Network Error Correction Process

Figure 4:
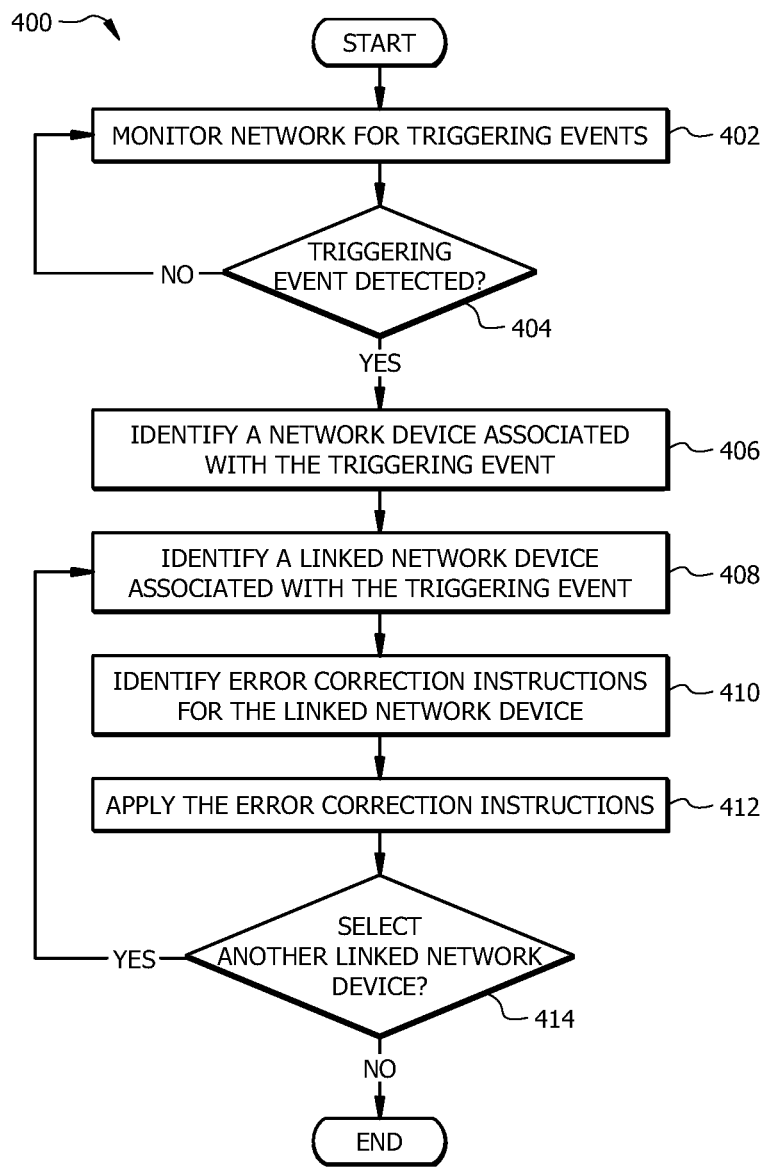
FIG. 4 is a flowchart of an embodiment of a network error correction process for the computer system.

FIG. 4 is a flowchart of an embodiment of network error correction process 400. The computer system 100 may employ process 400 to reroute data traffic in the event that a failed data communication is detected within the network 106. This process generally involves identifying any network devices 102 that are associated with the failed data communication and their corresponding error correction instructions 126. After identifying the appropriate error correction instructions 126, the network error correction device 104 can then apply the identified error correction instructions 126 to reroute data traffic within the network 106.

At operation 402, the network error correction device 104 monitors the network 106 for triggering events. A triggering event corresponds with a communication error between network devices 102 within the network 106. In one embodiment, the network error correction device 104 monitors the network 106 by monitoring network traffic information 128 for network device 102 within the network 106. For example, the network error correction device 104 may listen for alerts from within the network 106 that indicate a failed communication between network devices 102. In this example, the network error correction device 104 detects a triggering event in response to receiving an alert that indicates a failed communication between a pair of network devices 102. As another example, the network error correction device 104 may use historical network traffic information 128 to detect triggering events. In this example, the network error correction device 104 first obtains historical network traffic information 128 that comprises information about previous data communications within the network 106. The network error correction device 104 then obtains current network traffic information 128 that comprises information about the current data communications within the network 106. The network error correction device 104 may then detect a triggering event based on any decreases in data communications between network devices 102. For example, the network error correction device 104 may determine that the current data traffic between a first network device 102 and a second network device 102 is less than the historical or average data traffic between the first network device 102 and the second network device 102. In other examples, the network error correction device 104 may use any other suitable technique to monitor the network 106 and to detect triggering events within the network 106.

At operation 404, the network error correction device 104 determines whether a triggering event has been detected. The network error correction device 104 returns to operation 402 in response to determining that a triggering event has not been detected. In this case, the network error correction device 104 returns to operation 402 to continue monitoring the network 106 for triggering events. The network error correction device 104 proceeds to operation 406 in response to determining that a triggering event has been detected. In this case, the network error correction device 104 proceeds to operation 406 to identify corrective actions for resolving any failed communications within the network 106.

At operation 406, the network error correction device 104 identifies a network device 102 that is associated with the triggering event. As an example, the network error correction device 104 may determine that the triggering event was caused by a communication error between a first network device 102 and a second network device 102. In this case, the network error correction device 104 will identify a network device identifier 116 that corresponds with the first network device 102.

At operation 408, the network error correction device 104 identifies a linked network device 102 that is associated with the triggering event. Continuing with the previous example, the network error correction device 104 identifies the other network device 102 that was associated with the failed communications as a linked network device 102. In this example, the network error correction device 104 identifies a linked network device identifier 118 for the second network device 102.

At operation 410, the network error correction device 104 identifies error correction instructions 126 for the linked network device 102. Continuing with the previous example, after identifying the network device identifier 116 for the first network device 102, the network error correction device 104 then uses the network device identifier 116 to identify a node 302 in the computer network map 112 and its corresponding node properties 114. After identifying the node properties 114 for the first network device 102, the network error correction device 104 identifies an entry in the node properties 114 that corresponds with then linked network device identifier 118 that was determined in operation 408. The network error correction device 104 then identifies the error correction instructions 126 that are associated with the entry for the linked network device identifier 118. The identified error correction instructions 126 comprise instructions for rerouting data traffic from the second network device 102 to a third network device 102. For example, the error correction instructions 126 may comprise an address (e.g. IP address) for sending data traffic to the third network device 102.

In some embodiments, multiple error correction instructions 126 may be associated with a linked network device 102 based on the type of communication error that occurred. In this example, each set of error correction instructions 126 is associated with a different error type (i.e. error type identifier 122). In this case, the network error correction device 104 first identifies the type of communication error that caused the triggering event and then identifies the error correction instructions 126 that are linked with the corresponding error type identifier 122.

At operation 412, the network error correction device 104 applies the error correction instructions 126. Continuing with the previous example, applying the error correction instructions 126 may suspend sending data traffic to the address associated with the second network device 102, and instead, reroute data traffic to the address associated with the third network device 102. In some embodiments where the error correction instructions 126 comprise machine-executable code, the network error correction device 104 may execute the machine-executable code to apply the error correction instructions 126.

In some embodiments, the network error correction device 104 may update the node properties 114 after applying the error correction instructions 126. For example, the network error correction device 104 may update the node properties 114 by adding a linked network device identifier 118, device setting values 120 (e.g. an address), and error correction instructions 126 for the network device 102 where data traffic is being rerouted to in the node properties 114. This process allows the network error correction device 104 to maintain a contingency plan in event that there is a communication failure with the alternative network device 102.

At operation 414, the network error correction device 104 determines whether to select another linked network device 102. Here, the network error correction device 104 checks whether there are any other linked network devices 102 linked with the network device 102 and the triggering event. The network error correction device 104 will determine to select another linked network device 102 when data traffic has not been rerouted for a linked network device 102 that is associated with the triggering event. The network error correction device 104 returns to operation 408 in response to determining to select another linked network device 102. In this case, the network error correction device 104 returns to operation 408 to repeat the process of rerouting data traffic for another linked network device 102. The network error correction device 104 terminates process 400 in response to determining not to select another linked network device 102. In this case, the network error correction device 104 determines that no other linked network devices 102 have been affected and no further actions are necessary.

Hardware Configuration for the Network Error Correction Device

Figure 5:
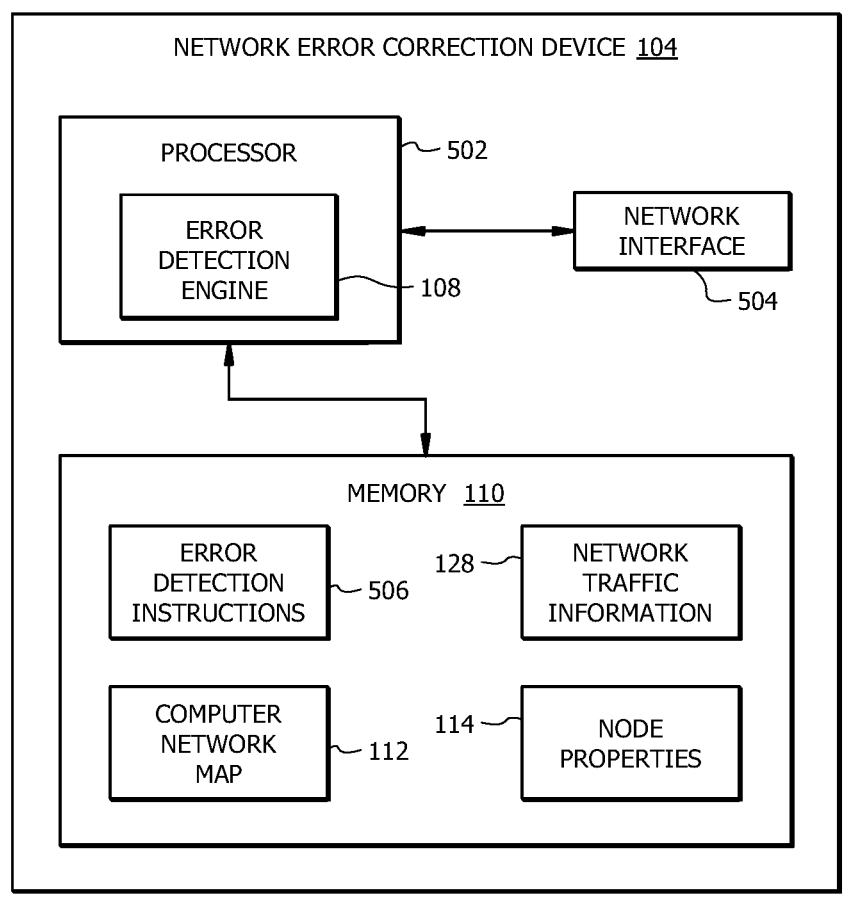
FIG. 5 is an embodiment of a network error correction device for the computer system.

FIG. 5 is an embodiment of a network error correction device 104 for the computer system 100. As an example, the network error correction device 104 may be a server, an access point, or a computer. The network error correction device 104 comprises a processor 502, a memory 110, and a network interface 504. The network error correction device 104 may be configured as shown or in any other suitable configuration.

Processor

The processor 502 is a hardware device that comprises one or more processors operably coupled to the memory 110. The processor 502 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 110 and the network interface 504. The one or more processors are configured to process data and may be implemented in hardware or software. For example, the processor 502 may be 8-bit, 16-bit, 32-bit, 64-bit, or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute error detection instructions 506 to implement the error detection engine 108. In this way, processor 502 may be a special-purpose computer designed to implement the functions disclosed herein. In an embodiment, the error detection engine 108 is implemented using logic units, FPGAs, ASICs, DSPs, or any other suitable hardware. The error detection engine 108 is configured to operate as described in FIGS. 1-4. For example, the error detection engine 108 may be configured to perform the operations of processes 200 and 400 as described in FIGS. 2 and 4, respectively.

Memory

The memory 110 is a hardware device that is operable to store any of the information described above with respect to FIGS. 1-4 along with any other data, instructions, logic, rules, or code operable to implement the function(s) described herein when executed by the processor 502. The memory 110 comprises one or more disks, tape drives, or solid-state drives, and may be used as an over-flow data storage device, to store programs when such programs are selected for execution, and to store instructions and data that are read during program execution. The memory 110 may be volatile or non-volatile and may comprise a read-only memory (ROM), random-access memory (RAM), ternary content-addressable memory (TCAM), dynamic random-access memory (DRAM), and static random-access memory (SRAM).

The memory 110 is operable to store error detection instructions 506, computer network maps 112, node properties 114, network traffic information 128, and/or any other data or instructions. The error detection instructions 506 may comprise any suitable set of instructions, logic, rules, or code operable to execute the error detection engine 108. The computer network maps 112, the node properties 114, and the network traffic information 128 are configured similar to the computer network maps 112, the node properties 114, and the network traffic information 128 described in FIGS. 1-4, respectively.

Network Interface

The network interface 504 is a hardware device that is configured to enable wired and/or wireless communications. The network interface 504 is configured to communicate data between network devices 102 and other devices, systems, or domains. For example, the network interface 504 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 502 is configured to send and receive data using the network interface 504. The network interface 504 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A network error correction device, comprising:
a memory operable to store a computer network map, wherein the computer network map comprises a plurality of nodes, wherein each node corresponds with a network device within a network;
a processor operably coupled to the memory, configured to:
detect a triggering event within the network, wherein the triggering event is associated with a communication error between a first network device and a second network device;
identify a first node in the computer network map corresponding with the first network device;
identify node properties for the first node, wherein the node properties comprise a first address for sending data traffic to the second network device, and error correction instructions associated with the second network device;
identify the error correction instructions associated with the second network device in the node properties for the first node, wherein the error correction instructions comprise a second address for rerouting data traffic to a third network device; and
apply the error correction instructions, wherein applying the error correction instructions comprises:
suspending data traffic to the first address for the second network device; and
rerouting data traffic to the second address for the third network device.

2. The device of claim 1, wherein the processor is further configured to:
update the node properties in response to applying the error correction instructions, wherein updating the node properties comprises:
adding a second device identifier for the third network device to the node properties;
adding the second address for the third network device; and
adding a second error correction instructions for the third network device, wherein the second error correction instructions comprise instructions for rerouting data traffic.

3. The device of claim 1, wherein:
the error correction instructions comprise machine-executable code; and
applying the error correction instructions comprises executing the machine-executable code.

4. The device of claim 1, wherein identifying the error correction instructions associated with the second network device comprises:
identifying an error type; and
identifying the error correction instructions associated with the error type.

5. The device of claim 1, wherein:
the first address is a first Internet Protocol (IP) address; and
the second address is a second IP address.

6. The device of claim 1, wherein detecting the triggering event within the network comprises receiving an alert from the first network device, wherein the alert indicates a failed communication with the second network device.

7. The device of claim 1, wherein detecting the triggering event within the network comprises:
obtaining historical network traffic information for the network comprising information about previous data communication between the first network device and the second network device;
receiving current network traffic information for the network comprising information about current data communication between the first network device and the second network device; and detecting a decrease in data communications between the first network device and the second network device based on the historical network traffic information and the current data communication.

8. A network error correction method, comprising:

detecting a triggering event within a network, wherein the triggering event is associated with a communication error between a first network device and a second network device;

identifying a first node in a computer network map corresponding with the first network device, wherein the computer network map comprises a plurality of nodes, wherein each node corresponds with a network device within a network;

identifying node properties for the first node, wherein the node properties comprise a first address for sending data traffic to the second network device, and error correction instructions associated with the second network device;

identifying the error correction instructions associated with the second network device in the node properties for the first node, wherein the error correction instructions comprise a second address for rerouting data traffic to a third network device; and applying the error correction instructions, wherein applying the error correction instructions comprises:
 suspending data traffic to the first address for the second network device; and
 rerouting data traffic to the second address for the third network device.

9. The method of claim 8, further comprising:

updating the node properties in response to applying the error correction instructions, wherein updating the node properties comprises:
 adding a second device identifier for the third network device to the node properties;
 adding the second address for the third network device; and
 adding a second error correction instructions for the third network device, wherein the second error correction instructions comprise instructions for rerouting data traffic.

10. The method of claim 8, wherein:

the error correction instructions comprise machine-executable code; and applying the error correction instructions comprises executing the machine-executable code.

11. The method of claim 8, wherein identifying the error correction instructions associated with the second network device comprises:
 identifying an error type; and
 identifying the error correction instructions associated with the error type.

12. The method of claim 8, wherein:

the first address is a first Internet Protocol (IP) address; and the second address is a second IP address.

13. The method of claim 8, wherein detecting the triggering event within the network comprises receiving an alert from the first network device, wherein the alert indicates a failed communication with the second network device.

14. The method of claim 8, wherein detecting the triggering event within the network comprises:
 obtaining historical network traffic information for the network comprising information about previous data communication between the first network device and the second network device;
 receiving current network traffic information for the network comprising information about current data communication between the first network device and the second network device; and
 detecting a decrease in data communications between the first network device and the second network device based on the historical network traffic information and the current data communication.

15. A non-transitory computer-readable medium storing instructions that when executed by a processor cause the processor to:

detect a triggering event within a network, wherein the triggering event is associated with a communication error between a first network device and a second network device;

identify a first node in a computer network map corresponding with the first network device, wherein the computer network map comprises a plurality of nodes, wherein each node corresponds with a network device within a network;

identify node properties for the first node, wherein the node properties comprise a first address for sending data traffic to the second network device, and error correction instructions associated with the second network device;

identify the error correction instructions associated with the second network device in the node properties for the first node, wherein the error correction instructions comprise a second address for rerouting data traffic to a third network device; and apply the error correction instructions, wherein applying the error correction instructions comprises:
 suspending data traffic to the first address for the second network device; and
 rerouting data traffic to the second address for the third network device.

16. The non-transitory computer-readable medium of claim 15, wherein the instructions further cause the processor to:

update the node properties in response to applying the error correction instructions, wherein updating the node properties comprises:
 adding a second device identifier for the third network device to the node properties;
 adding the second address for the third network device; and
 adding a second error correction instructions for the third network device, wherein the second error correction instructions comprise instructions for rerouting data traffic.

17. The non-transitory computer-readable medium of claim 15, wherein:

the error correction instructions comprise machine-executable code; and applying the error correction instructions comprises executing the machine-executable code.

18. The non-transitory computer-readable medium of claim 15, wherein identifying the error correction instructions associated with the second network device comprises:
 identifying an error type; and
 identifying the error correction instructions associated with the error type.

19. The non-transitory computer-readable medium of claim 15, wherein detecting the triggering event within the network comprises receiving an alert from the first network device, wherein the alert indicates a failed communication with the second network device.

20. The non-transitory computer-readable medium of claim 15, wherein detecting the triggering event within the network comprises:
   obtaining historical network traffic information for the network comprising information about previous data communication between the first network device and the second network device;
   receiving current network traffic information for the network comprising information about current data communication between the first network device and the second network device; and
   detecting a decrease in data communications between the first network device and the second network device based on the historical network traffic information and the current data communication.

* * * * *